United States Patent [19]
Kashiwagi

[11] Patent Number: 6,069,868
[45] Date of Patent: May 30, 2000

[54] MULTIPLE LAYER OPTICAL DISK STORING INFORMATION AT A LIKE MULTIPLE DENSITIES

[75] Inventor: Toshiyuki Kashiwagi, Tokyo, Japan

[73] Assignee: Sony Corporation, Tokyo, Japan

[21] Appl. No.: 09/310,127

[22] Filed: May 12, 1999

[30] Foreign Application Priority Data

May 13, 1998 [JP] Japan ................................ P10-130453

[51] Int. Cl.[7] ............................... G11B 11/00; G11B 7/24
[52] U.S. Cl. .......................................... 369/275.1; 369/13
[58] Field of Search ............................. 369/275.1, 275.3, 369/275.4, 275.2, 13, 283, 284, 94, 44.38, 110, 116, 109, 58, 54, 33, 44.26, 44.37

[56] References Cited

U.S. PATENT DOCUMENTS 5,708,652  1/1998  Ohki et al. ............................ 369/275.1
5,923,625  7/1999  Shimazaki et al. ....................... 369/13

*Primary Examiner*—Ali Neyzari
*Attorney, Agent, or Firm*—Hill & Simpson

[57] ABSTRACT

A two-layer disk or a three-layer optical disk consisting of two base disks fastened together and capable of low density recording, medium density recording and further high density recording in a process for fastening together two base disks of transparent synthetic resin and each base disk has two reflective films respectively for high density information recording and low density information recording. The information record layer (high density recording layer) for the first optical base disk is reproduced at optical parameters of a wavelength ($\lambda$) less than or equal to 460 nm and a numerical aperture (NA) greater than or equal to 0.6. The information record layer (low density recording layer) for the second optical base disk is reproduced at optical parameters of a wavelength ($\lambda$) greater than or equal to 770 nm and less than or equal to 830 nm and further has a numerical aperture (NA) equal to 0.45 plus or minus 0.05.

12 Claims, 3 Drawing Sheets

MULTIPLE LAYER OPTICAL DISK STORING INFORMATION AT A LIKE MULTIPLE DENSITIES

RELATED APPLICATION DATA

The present application claims priority to Japanese Application No. P10-130453 filed May 13, 1998, which application is incorporated herein by reference to the extent permitted by law.

BACKGROUND OF THE INVENTION

1. Field of the Invention

The present invention relates to an optical disk comprised of two base disks fastened together and to an optical disk device for record and reproduction of an optical disk.

2. Description of Related Art

A two layer type optical disk made by fastening two base disks together has two levels of information record layers consisting of information record layers formed on the inner side of each of the base disks.

In other words, in a dual surface, single-layer type optical disk, the surface of a first base disk made from transparent synthetic resin such as polycarbonate, is formed of a pattern which indicates information, then a second base disk formed in the same way as the first base disk, is placed on the first disk with an application of transparent adhesive and the two base disks fastened together by the hardening of this transparent adhesive.

In such cases, the second base disk is formed with a reflective film instead of a semitransparent layer of the first base disk.

In an optical disk configured in this way, when the laser beam for recording and reproduction from the first base disk is for instance beamed so as to focus onto a point on the semitransparent film serving as the information record layer of the base disk, an information signal is reproduced from the information recorded on the information record layer of the first base disk, based on the returning light beam reflected from the semitransparent film.

On the other hand, when the laser beam is beamed so as to focus on the reflective layer serving as the information record layer of the second base disk, an information signal is reproduced from the information recorded on the information record layer of the second base disk, based on the returning light beam reflected from this reflective film.

Accordingly, reproduction of information on the information record layer of the first base disk and the information record layer of the second base disk of the optical disk is performed by using the same optical pickup from one side of the optical disk.

In the known art, optical disks have been proposed with the information record layer of the first base disk and the information record layer of the second base disk having mutually different signal recording densities, and for instance optical disks with the beam input side of the information record layer having a higher record density.

In optical disks of this type, a low density information record layer such as the information record layer of a second base disk in the related art generally uses a laser beam of 780 nm and is also capable for instance of being played back on compact discs (CD) players of the related art. A laser beam on a wavelength of 780 nm thus passes through the information record layer of the first base disk and is reflected from the information record layer of the second base disk and is then detected after again passing through the information record layer of the first base disk and playback (reproduction) of the information record layer of the second base disk thus performed.

The information record layer of the first base disk on the other hand is an information record layer of even higher density and is configured for a laser beam of a shorter wavelength for instance of 650 nm or 635 nm. This laser beam with a wavelength of 650 nm or 635 nm is reflected at the information record layer of the first base disk and playback (reproduction) performed by detecting the returning light.

In recent years, along with the spread of optical disks having high density information record layers for laser beams on wavelengths of 650 nm or 635 nm (hereafter, medium density record layers), optical disks of even higher density have been developed.

These optical disks for even higher density recording use a blue laser light on a wavelength for instance of 410 nm. Reproduction (playback) devices for optical disks having low density recording layers or medium density recording layers cannot reproduce (playback) these high density optical disks.

In view of the above situation, this invention therefore has the above object of providing a two layer or three layer optical disk made by fastening together two base disks and an optical disk device for recording and reproduction of this optical disk, and capable of recording both low density record information and high density record information, or alternatively capable of recording all three types of densities, namely medium density recording information as well as low and high density record information.

SUMMARY OF THE INVENTION

In order to accomplish the above objects, this invention of claim 1 is an optical disk comprised of a first and a second base disk of a circular shape made from transparent synthetic resin, a first information record layer having a semi-permeable reflective film formed on at least one surface of said first base disk, a second information record layer having a reflective film formed on at least one surface of said second base disk, a transparent adhesive layer for attaching said first and said second base disks together so that said first and said second information record layers are positioned on the beam input side and opposite side, and further so said first information record layer is on the beam input side to a greater extent than the second information record layer when a laser beam is irradiated onto the disk in order to reproduce said first and said second base disks, and said optical disk is characterized in that said first information record layer is recorded with high density information compared to said second information record layer, and information recorded on said first information record layer is reproduced by an optical pickup at optical parameters of a wavelength ($\lambda$) less than or equal to 460 nm and a numerical aperture (NA) greater than or equal to 0.6, and information recorded on second information record layer is reproduced with an optical pickup at optical parameters of a wavelength ($\lambda$) greater than or equal to 770 nm and less than or equal to 830 nm and further has a numerical aperture (NA) equal to 0.45 plus or minus 0.05.

In the configuration of claim 1, the laser beam input side of the information record layer of the first base disk functioning as the high density record layer was reproduced or played back at optical parameters of a wavelength ($\lambda$) less than or equal to 460 nm and a numerical aperture (NA)

greater than or equal to 0.6 while the information record layer of the second base disk functioning as the low density record layer was reproduced or played back at optical parameters of a wavelength (λ) greater than or equal to 770 nm and less than or equal to 830 nm and further having a numerical aperture (NA) equal to 0.45 plus or minus 0.05. The low density record layer of an optical disk of this type can therefore be played back on conventional low density recording optical disks (compact discs) utilizing laser beams at a wavelength of 780 nm, yet the high density record layer of this same optical disk can be played back on high density optical disk devices utilizing laser beams on a wavelength of 410 nm.

Therefore, besides record and playback of low density record layers on optical disk devices for conventional low density optical disks, high density information record layers can be played back on new high density optical disk devices. Accordingly, along with one optical disk being compatible for use on both types of disk devices, playback of the same optical disk can be still be achieved if the user in the future purchases a high density optical disk device so that future practicality and convenience for the user is assured.

The recording capacity required for current high density record layers is at least 8.5 GB (gigabytes). Here, the conditions for wavelength (λ) less than or equal to 460 nm is a parameter correlating to base thickness and numerical aperture (NA) values.

Among the optical parameters of the low density record layer, the wavelength λ conditions are compatible with current optical recording media and even if the formats for such media are changed these conditions will still be within the limits parameter limits and compatible. When the wavelength (λ) deviates outside a figure greater than or equal to 770 nm and less than or equal to 830 nm, the resolution of the playback (reproduction) spot decreases and playback becomes impossible.

The reflectivity is 10 percent or more for a high density record layer with a wavelength (λ) greater than or equal to 770 nm and less than or equal to 460 nm, and the transmittance is 40 percent or more at a (λ) greater than or equal to 770 nm and less than or equal to 830 nm. When forming the semitransparent layer formed preferably from silicon compounds, the laser beam for the high density recording layer is effectively reflected by this semitransparent layer so that along with obtaining a sufficient amount of light returning from the high density recording layer, the laser beam for the low density record layer can permeate through the semitransparent layer and sufficient amounts of beamed light and returning light can be obtained.

Here, when the reflectivity falls below 10 percent, the amount of light returning from the high density record layer is insufficient and the play (reproduction) characteristics of the high density record layer deteriorate. When the transmittance falls below 40 percent, the amount of light directly beaming onto the low density record layer and the amount of returning light is insufficient so the play (reproduction) characteristics of the high density record layer deteriorate.

When the thickness of the above-mentioned transparent adhesive layer is 10 to 100 micrometers, the transparent adhesive layer functions to maintain a gap between the high density record layer and low density record layer by means of the thickness of the adhesive layer, and the wavelength beams at their respective specified wavelengths can focus on the target record layer.

When the thickness of the transparent adhesive layer falls below the lower limit, the gap between the high density record layer and low density record layer becomes too narrow and when the laser beam of a specific wavelength strikes the record layer, returning light is generated from the other recording layer so that play (reproduction) characteristics deteriorate. Also, when the thickness of the transparent adhesive layer exceeds the upper limit, and a laser beam for the low density record layer permeates through the transparent adhesive layer, the amount of light declines. Consequently, the amount of light beaming onto the low density record layer and the amount of returning light are insufficient so that play (reproduction) characteristics deteriorate.

DESCRIPTION OF THE PREFERRED EMBODIMENTS

Hereafter a detailed description of the preferred embodiments of this invention will be related while referring to FIG. 1 through FIG. 4.

The working examples described next are preferred embodiments of this invention having preferred technical variations with certain limits however the scope of this invention is not limited to the following description and not limited to the examples described below.

Figure 1:
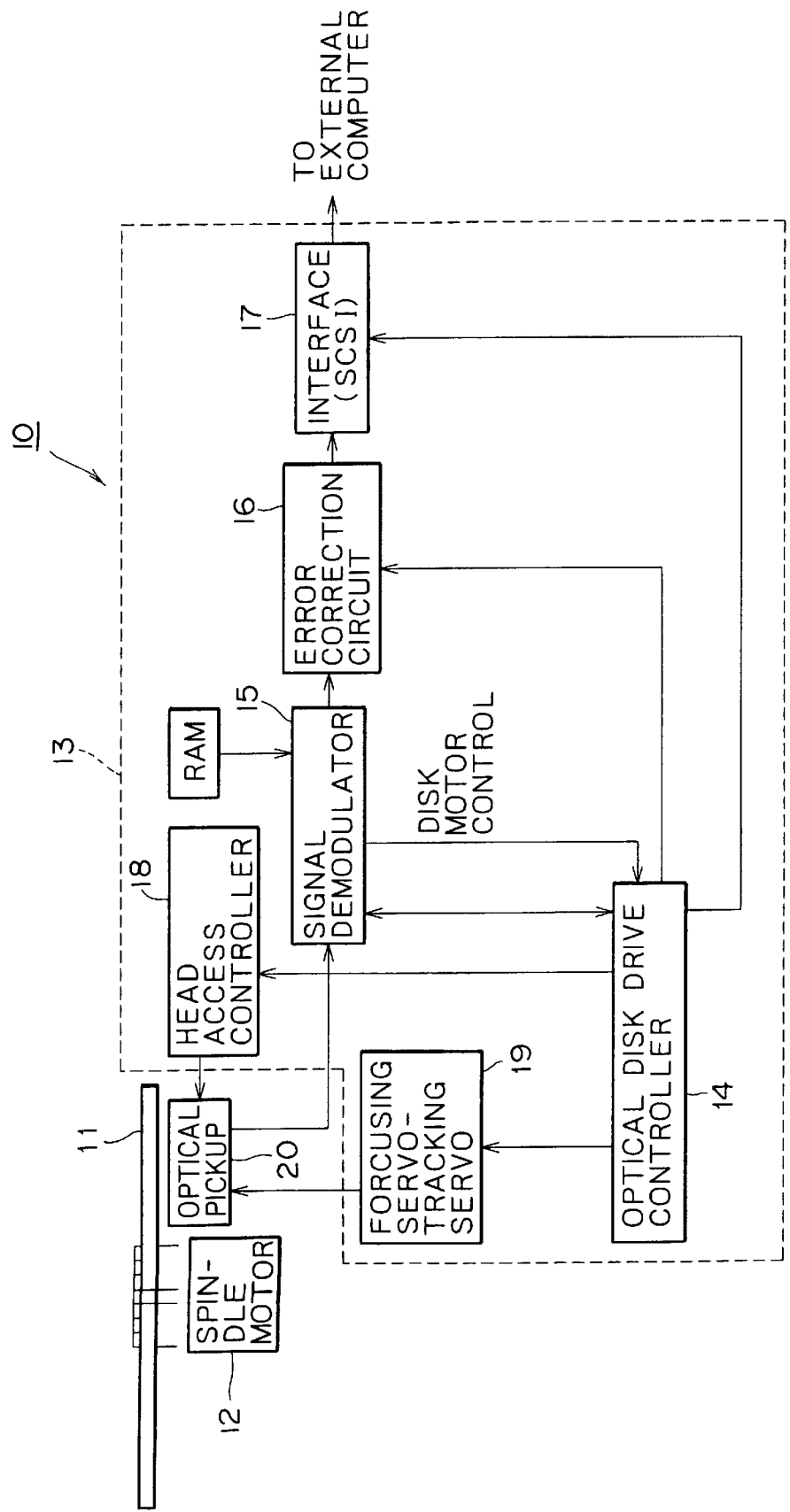
FIG. 1 is a block diagram showing the configuration of the optical disk device of this invention.

FIG. 1 is a block diagram showing the overall configuration of the optical disk device to play back the optical disk of this invention.

In FIG. 1, an optical disk device 10 is comprised of a spindle motor 12 as a drive means to rotate an optical disk 11, an optical pickup 20 to project a laser beam onto the signal record surface of the rotating optical disk 11 and reproduce the laser beam returning from the signal record surface, and a controller 13 to control these components of the optical disk device 10.

The controller 13 is comprised of an optical disk drive controller 14, a signal demodulator 15, an error correction circuit 16, an interface 17, a head access controller 18 and a servo circuit 19.

The optical disk drive controller 14 drives the spindle motor 12 at a specified speed (rpm). The demodulator 15 demodulates the record signal from the optical pickup 20, performs error correction and sends the demodulated signal to the external computer via the interface 17. This process allows a device such as an external computer to accept the signal recorded by the optical disk 11 as a playback signal.

The head access controller 18 moves the optical pickup 20 for instance, to a specified record track by means of a track jump, etc. At this specified position, the objective lens supported by the biaxial actuator of the optical pickup 20 moves in the directions required for focusing and for tracking.

Figure 2:
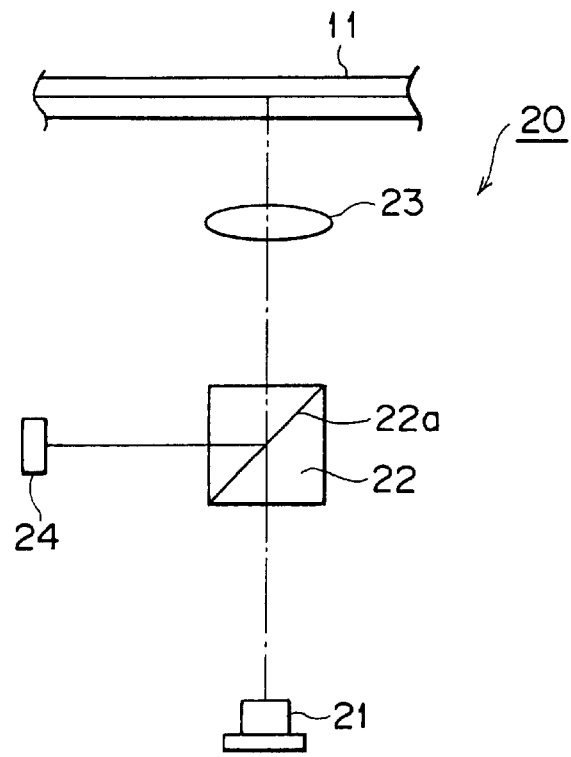
FIG. 2 is a concept drawing showing the configuration of the optical pickup for the optical disk device of this invention.

FIG. 2 is a concept view showing the layout of the optical pickup 20 built into the optical disk device 10.

In FIG. 2, the optical pickup 20 is comprised of a beam splitter 22 functioning as the laser beam splitting means, as well as an objective lens 23 as the light focusing means installed along the optical path of the laser beam sent from the pumped light source 21, and an optical sensor 24 installed in the beam splitting path of the beam splitter 22.

The pumped light source 21 contains a semiconductor laser element used for reconverging the light from the semiconductor diode, and emitting a specific laser light.

The pumped light source 21 contains a semiconductor laser element (not shown in drawing) for emitting a laser beam on the various required wavelengths and as subsequently related, preferably can selectively emit a laser beam with wavelengths of two or three types, such as for instance, a laser beam with a wavelength of 780 nm for low density record optical disks, a laser beam with a wavelength of 635 nm or 650 nm for medium density record optical disks and further a laser beam with a wavelength of 410 nm for high density optical disks.

A plurality of pumped light sources 21 may be provided for respective wavelengths.

A semitransparent film 22a is installed tilted at a 45 degree angle with respect to the optical axis in the beam splitter 22, and separates the light returning from the signal record surface of the optical disk 11 and the light from the laser beam from the pumped light source 21. In other words, a portion of the laser beam from the pumped light source 21 permeates through the semitransparent film 22a of the beam splitter 22 and a portion of the returning light beam is reflected at the semitransparent film 22a.

The objective lens 23 is a protruding lens and focuses the laser beam from the beam splitter 22 onto the desired point of the signal record surface on the record track of the rotating optical disk 11.

The objective lens 23 is movably supported by a biaxial actuator not shown in the drawing to move along two axes or in other words to move in the focusing and tracking directions.

The optical sensor 24 has a light sensitive area for receiving the returning light reflected from the beam splitter 22.

Figure 3:
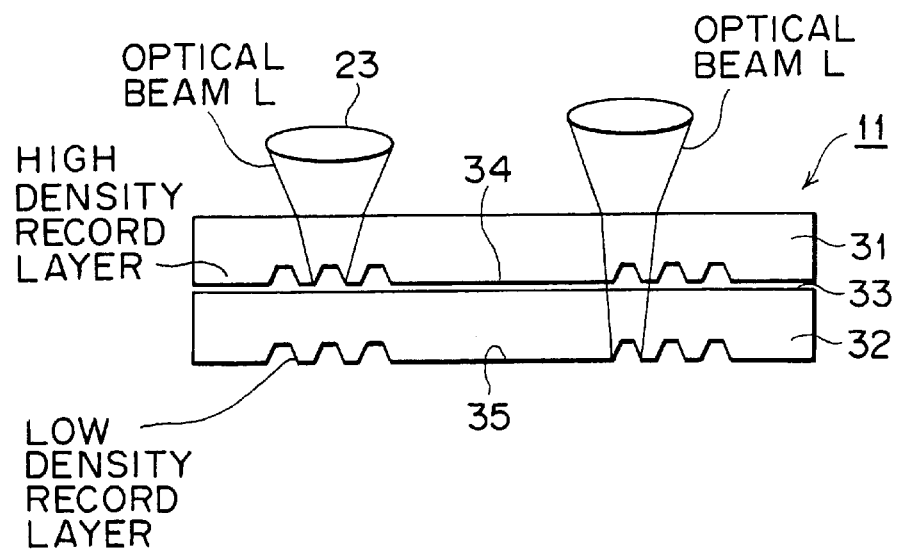
FIG. 3 is an enlarged cross sectional view of the first embodiment of the optical disk of this invention.

The optical disk 11 of the first embodiment of this invention is configured as shown in FIG. 3.

The optical disk of FIG. 3 is comprised of two optical base disks 31, 32 having a thickness T of 0.6 mm and made from transparent synthetic resin such as polycarbonate, as well as a transparent adhesive layer 33 for fastening together these two optical base disks 31, 32. A laser beam L from the pumped light source 21 of the optical pickup 20 is emitted so as to irradiate from the upper side per FIG. 3.

The inner side of the first base disk 31 (lower surface in FIG. 3) is for instance formed with an irregular shape corresponding to the record information and then a semipermeable reflective film 34 is formed above the irregularly shaped inner side.

The inner side of the second base disk 32 (lower surface in FIG. 3) is for instance formed with an irregular shape corresponding to the record information and then a reflective film 35 is formed above the irregularly shaped inner side.

Also in this optical disk 11, an information record layer serving as the high density record layer is further configured by the reflective layer 34, and an information record layer serving as the low density record layer is further configured by the reflective layer 35.

The high density record layer comprising the reflective film 34 is configured to be reproduced by an optical pickup at optical parameters of wavelength ($\lambda$) less than or equal to 460 nm and a numerical aperture (NA) greater than or equal to 0.6.

The low density record layer comprising the reflective film 35 is configured to be reproduced with an optical pickup at optical parameters of a wavelength ($\lambda$) greater than or equal to 770 nm and less than or equal to 830 nm and further has a numerical aperture (NA) equal to 0.45 plus or minus 0.05.

The reflective film 34 preferably comprised of silicon compounds is configured to have a reflectivity of 10 percent or more at a wavelength ($\lambda$) greater than or equal to 380 nm and less than or equal to 460 nm and also to have a transmittance rate of 40 percent or more at a wavelength ($\lambda$) greater than or equal to 770 nm and less than or equal to 830 nm.

If the reflectivity falls below 10 percent for wavelength ($\lambda$) greater than or equal to 380 nm and less than or equal to 460 nm, then the amount of returning light from the high density record layer will be insufficient and the reproduction (playback) characteristics of the high density record layer will deteriorate. Also, when the transmittance rate falls below 40 percent for a wavelength ($\lambda$) greater than or equal to 770 nm and less than or equal to 830 nm, then the amount of light beamed onto the low density record layer will decline and the reproduction (playback) characteristics of the low density record layer will deteriorate.

The DVD disk which has for instance the highest density recording of currently used optical recording mediums has a (medium density record layer) with optical parameters of a wavelength ($\lambda$) of 0.635 nm or 0.65 nm, a NA (numerical aperture) of 0.6 and a track pitch (TP) of 0.4 micrometers. These parameters have the following relation.

$$TP = 0.74 \times (\lambda/0.635) \times (0.6\ NA)$$

Minimum pit length $(Pmin) = 0.4 \times (\lambda/0.635) \times (0.6\ NA)$

When the above optical parameters of this embodiment of a wavelength ($\lambda$) less than or equal to 460 nm and a numerical aperture (NA) greater than or equal to 0.6 are substituted into the above formulas, a TP less than or equal to 0.54 micrometers and a Pmin of less than or equal to 0.29 micrometers is obtained.

Further, the current technical limit on the wavelength $\lambda$ is less is 0.38 micrometers and the limit on NA is a maximum of 0.95 so that a TP greater than or equal to 0.28 micrometers and a Pmin greater than or equal to 0.15 micrometers is obtained.

In order to satisfy the above conditions, as disclosed in Japanese Patent Laid Open No. Hei 1-28802, the semipermeable reflective film 34 must be formed of silicon compounds containing at least one element from among nitrogen, oxygen and hydrogen. The reflectivity is corrected as needed by changing the thickness of the film.

The transparent adhesive layer 33 is selected for a thickness for example from 10 to 100 micrometers. In a thickness of this range, the high density record layer of the first base disk 31 and the medium density record layer of the second base disk 32 are positioned at a mutually appropriate gap and the laser beam from the pumped light source 20 emitted from the optical pickup 20 can reliably focus on each record layer.

However, when the thickness falls below the lower limit, the gap between the high density record layer and the medium density record layer becomes too narrow so that when a laser beam of a specified wavelength irradiates on a particular layer, a return light is generated from the other record layers so that the reproduction (playback) characteristics deteriorate. Further, when the upper limit of the thickness is exceeded and a laser beam for the medium density record layer permeates through the transparent adhesive layer, the amount of light diminishes so that the amount of light beaming onto the medium record layer and the amount of returning light is insufficient and the reproduction (playback) characteristics deteriorate.

The optical disk 11, the optical pickup 20 and the optical disk device 10 of this embodiment configured as described above, operate as described next.

Playback or reproduction of the high density record layer is first explained. Namely, the spindle motor 12 of the optical device 10 rotates to rotatably drive the optical disk 11. The optical pickup 20 then moves along a guide not shown in the drawing and by being moved in the rearward direction of the optical disk 11, the optical axis of the objective lens 23 is moved to the desired track position on the optical disk 11 and access thus performed.

In the optical pickup 20 in this state, the laser beam at a wavelength of 410 nm from the pumped light source 21 passes through the beam splitter 22 and is focused on the high density record layer of the first base disk 31 by means of the objective lens 23.

The objective lens in this case is designed to irradiate the high density record layer with light at a wavelength of 410 nm and a numerical aperture (NA) greater than or equal to 0.6.

When the numerical aperture (NA) is less than 0.6, the laser beam irradiating on the high density record layer is prone to spherical aberrations and becomes distorted.

The returning light containing the signal from the high density record layer of the optical disk 11 is once again input to the beam splitter through the objective lens 23. The light is then reflected by the semipermeable film 22a in the beam splitter 22 and input to the optical sensor 24. The record signal of the high density record layer on the optical disk 11 is thus detected based on the detection signal from the optical sensor 24 and a playback signal generated.

The demodulator 15 detects the tracking error signal and the focus error signal from the signal detected in the optical sensor 24 by means of a suitable method. The servo circuit 19 performs servo control by way of the optical disk controller 14 and focusing and tracking of the objective lens 23 of the optical pickup 20 are thus performed.

The playback (or reproduction) of the low density record layer of the optical disk 11 is performed as follows. Namely, the procedure is just the same as for the high density record layer with the optical disk 11 being rotatably driven and access performed by the optical amplifier 20.

In the optical pickup 20 in this state, the laser beam at a wavelength of 650 nm from the pumped light source 21 passes through the beam splitter 22 and is focused on the low density record layer of the second base disk 32 by means of the objective lens 23.

The objective lens in this case is designed to irradiate the low density record layer with light at a wavelength of 650 nm and a numerical aperture (NA) of 0.60 plus or minus 0.5.

When the numerical aperture (NA) deviates from the above conditions, the laser beam irradiating on the low density record layer is prone to spherical aberrations and becomes distorted.

The returning light containing the signal from the high density record layer of the optical disk 11 is once again input to the beam splitter through the objective lens 23. This light is then reflected by the semipermeable film 22a in the beam splitter 22 and input to the optical sensor 24. The record signal of the high density record layer on the optical disk 11 is thus detected based on the detection signal from the optical sensor 24 and a playback signal generated.

The demodulator 15 detects the tracking error signal and the focus error signal from the signal detected in the optical sensor 24 by means of a suitable method. The servo circuit 19 performs servo control by way of the optical disk controller 14 and focusing and tracking of the objective lens 23 of the optical pickup 20 are thus performed.

In this way, by providing the optical disk 11 with a high density record layer and a low density record layer, along with the low density record layer being capable of being played back (reproduced) by a conventional optical disk device utilizing for instance a laser beam with a wavelength 780 nm, a high density record layer on the same optical disk 11 is capable of being played back (reproduced) by a new custom disk device utilizing for instance a laser beam with a wavelength of 410 nm. Accordingly, when the same information contents are recorded on for instance, the high density record layer and the low density record layer, either of the above optical disk devices can be utilized to play back the recorded information.

Figure 4:
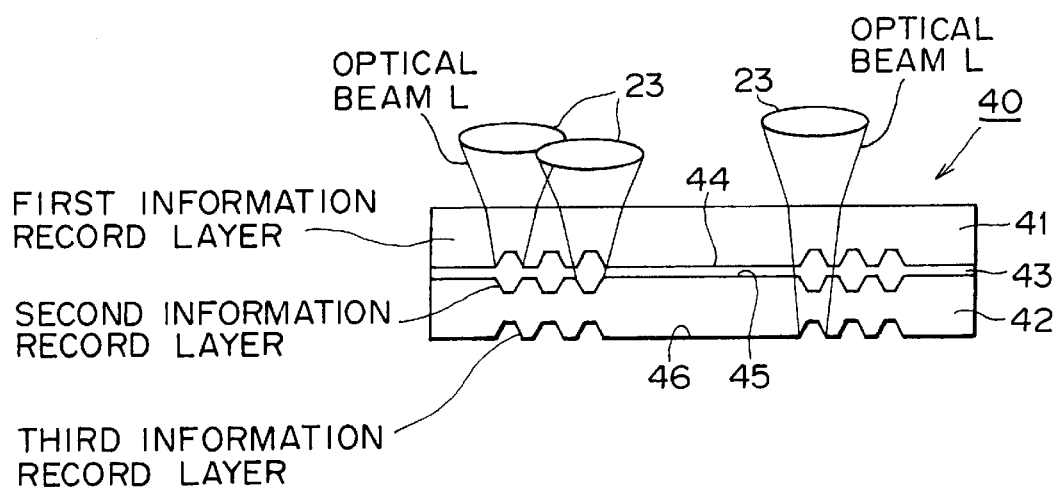
FIG. 4 is an enlarged cross sectional view of the second embodiment of the optical disk of this invention.

FIG. 4 shows the second embodiment of the optical disk of this invention.

An optical disk 40 in FIG. 4, is comprised of two base disks 41, 42 just the same as shown for the optical disk 11 in FIG. 3, and a transparent adhesive layer 43 for fastening together the two base disks 41, 42.

Just as with the first base disk 31 in FIG. 3, the first base disk 41 is formed on the inner surface (lower surface in FIG. 4) for instance with irregularities (concavities and protrusions) forming shapes to correspond to the information, and a semipermeable reflective film 44 is then formed on the first base disk 41.

After the upper and lower surfaces of the second base disk 42 are formed for instance with irregularities (concavities and protrusions) in shapes to corresponding to the information, a semipermeable reflective film 45 is then formed on the upper surface and a semipermeable reflective film 46 is formed on the lower surface of the second base disk 42.

Further, the first information record layer is configured as the high density record layer by means of the reflective film 44, the second information record layer is configured as the medium density record layer by means of the reflective film 45 and the third information record layer is configured as the low density record layer by means of the reflective film 46.

The first information record layer is configured by means of the reflective film 44 to be reproduced by an optical pickup at optical parameters of a wavelength ($\lambda$) less than or equal to 460 nm and a numerical aperture (NA) greater than or equal to 0.6.

The second information record layer is configured by means of the reflective film 45 to be reproduced by an optical pickup at optical parameters of a wavelength ($\lambda$) less than or equal to 655 nm and greater than or equal to 615 nm and a numerical aperture (NA) equal to 0.6 plus or minus 0.5.

However, the third information record layer is configured by means of the reflective film 46 to be reproduced by an optical pickup at optical parameters of a wavelength ($\lambda$) less than or equal to 830 nm and greater than or equal to 770 nm and a numerical aperture (NA) equal to 0.45 plus or minus 0.5.

The reflective film 44 is preferably comprised of silicon compounds and configured to have a reflectivity of 10 percent or more for a wavelength ($\lambda$) less than or equal to 460 nm and greater than or equal to 380 nm, and to have a transmittance rate of 40 percent or more for a wavelength ($\lambda$) less than or equal to 650 nm and greater than or equal to 615 nm, and further to have a transmittance rate of 60 percent or more for a wavelength (λ) less than or equal to 830 nm and greater than or equal to 770 nm.

The reflective film 45 is preferably comprised of silicon compounds and configured to have a reflectivity of 20 percent or more for a wavelength (λ) less than or equal to 655 nm and greater than or equal to 615 nm, and to have a transmittance rate of 60 percent or more for a wavelength (λ) less than or equal to 830 nm and greater than or equal to 770 nm.

However, the reflective film 46 is configured to have a reflectivity of 60 percent or more at a wavelength (λ) less than or equal to 830 nm and greater than or equal to 770 nm.

However, when the reflectivity falls below 10 percent for the reflective film 44 with a wavelength (λ) less than or equal to 460 nm and greater than or equal to 380 nm, then the amount of light returning from the first information record layer is insufficient and the reproduction (playback) characteristics of the first information record layer deteriorate. Further, in the reflective film 44, when the transmittance rate falls below 40 percent for a wavelength (λ) less than or equal to 650 nm and greater than or equal to 615 nm, or when the transmittance rate falls below 60 percent for a wavelength (λ) less than or equal to 830 nm and greater than or equal to 770 nm, then the amount of light beaming on the second and third information record layers is insufficient and the record as well as the playback (reproduction) characteristics of the second and third information record layers deteriorate.

When the reflectivity falls below 20 percent in the reflective layer 45 for a wavelength (λ) less than or equal to 655 nm and greater than or equal to 615 nm, the amount of light returning from the second information record layer is insufficient and the playback (reproduction) characteristics of the second information record layer deteriorate. When the transmittance rate falls below 60 percent in the reflective layer 45 for a wavelength (λ) less than or equal to 830 nm and greater than or equal to 770 nm, then the amount of light beaming onto the third information record layer and the amount of returning light is insufficient so that the playback (reproduction) characteristics of the third information record layer deteriorate.

In the reflective film 46, when the reflectivity falls below 60 percent for a wavelength (λ) less than or equal to 830 nm and greater than or equal to 770 nm, then the amount of light returning from the third information record layer is insufficient and the reproduction (playback) characteristics of the third information record layer deteriorate.

The first information record layer further has pit parameters consisting of a track pitch greater than or equal to 0.30 micrometers and less than or equal to 0.70 micrometers as well as a minimum pit length greater than or equal to 0.15 micrometers and less than or equal to 0.40 micrometers. Also, the second information record layer further has pit parameters consisting of a track pitch greater than or equal to 0.70 micrometers and less than or equal to 0.80 micrometers as well as a minimum pit length greater than or equal to 0.40 micrometers and less than or equal to 0.45 micrometers. The third information record layer however has pit parameters consisting of a track pitch greater than or equal to 1.40 micrometers and less than or equal to 1.70 micrometers as well as a minimum pit length greater than or equal to 0.80 micrometers and less than or equal to 1.0 micrometers.

The reasons here for establishing the above track pitch are the same as related for the first embodiment. Further, the structure of the semipermeable reflective film and the design method are the same as related for the first embodiment.

The transparent adhesive layer 43 is selected for a thickness for example from 10 to 100 micrometers. In a thickness of this range, the first information record layer of the first base disk 41 and the second information record layer of the second base disk 42 are positioned at a mutually appropriate gap and the laser beam from the pumped light source 21 of the optical pickup 20 can reliably focus on each record layer.

However, when the thickness falls below the lower limit, the gap between the first and second information record layers becomes too narrow so that when a laser beam of a specified wavelength irradiates on a particular layer, a return light is generated from the other record layers so that the reproduction (playback) characteristics deteriorate. Further, when the upper limit of the thickness is exceeded, and a laser beam for the first and second information record layers permeates through the transparent adhesive layer, the amount of light diminishes so that the amount of light beaming onto the first and second information record layers and the amount of returning light are insufficient and the record as well as the reproduction (playback) characteristics deteriorate.

The second information record layer in the optical disk 40 may be configured to be played back (or be reproduced) by an optical pickup at optical parameters of a wavelength (λ) less than or equal to 460 nm and a numerical aperture (NA) greater than or equal to 0.6.

In this case, besides the second information record layer being capable of being played back by a laser beam of the same 410 nm wavelength as for playing back the first information record layer, the second information record layer is also capable of being played back on conventional optical disk devices for playing back medium density optical record disks at wavelengths of 635 nm or 650 nm.

Also, the third information record layer in the optical disk 40 may be configured to be played back (or reproduced) by an optical pickup at optical parameters of a wavelength (λ) less than or equal to 460 nm and a numerical aperture (NA) greater than or equal to 0.6, or may be played back (or be reproduced) by an optical pickup at optical parameters of a wavelength (λ) less than or equal to 655 nm and greater than or equal to 615 nm and a numerical aperture (NA) equal to 0.6 plus or minus 0.5.

In this case, besides the third information record layer being capable of being played back by a laser beam of the same 410 nm, 635 nm or 650 nm wavelength as for playing back the first information record layer or the second information record layer, the third information record layer is further capable of being played back on conventional optical disk devices for playing back low density optical record disks at wavelengths of 780 nm.

The description for the above embodiments described operation of an optical device 10 exclusively for playback of optical disks however this invention is not limited to this example and may comprise a record/playback optical disk device for both record and playback of the high density record layer and medium density record layer of the optical disk 11. Furthermore, an optical disk device may also be used that is configured for playback of the high density record layer of the optical disk 11 as well as performing playback of the medium density record layer and the low density record layer.

What is claimed is:

1. An optical disk comprising:

first and second base disks made from transparent synthetic resin;

a first information record layer having a semitransparent reflective film formed on a surface of said first base disk;

a second information record layer having a reflective film formed on a surface of said second base disk; and a transparent adhesive layer securing said first and said second base disks together so that said first and said second base disks have a beam input side on which one or more laser beams are irradiated onto the disk in order to reproduce information on said first and said second base disks and an opposite side, and further so said first information record layer is positioned closer to beam input side than the second information record layer, wherein, said first information record layer is recorded with information at a higher density compared to said second information record layer, information recorded on said first information record layer is reproduced by an optical pickup with optical parameters of a wavelength ($\lambda$) less than or equal to 460 nm and a numerical aperture (NA) greater than or equal to 0.6, and information recorded on second information record layer is played back or reproduced with an optical pickup with optical parameters of a wavelength ($\lambda$) greater than or equal to 770 nm and less than or equal to 830 nm and further has a numerical aperture (NA) equal to 0.45 plus or minus 0.05, said first information record layer has a track pitch greater than or equal to 0.30 micrometers and less than or equal to 0.70 micrometers and further having a pit parameter of a shortest pit length greater than or equal to 0.15 micrometers and less than or equal to 0.40 micrometers; and said second information record layer has a track pitch greater than or equal to 1.40 micrometers and less than or equal to 0.70 micrometers and further having a pit parameter of a shortest pit length greater than or equal to 0.80 micrometers and less than or equal to 1.0 micrometer.

2. An optical disk comprising:

first and second base disks made from transparent synthetic resin;

a first information record layer having a semitransparent reflective film formed on at least one surface of said first base disk;

a second information record layer having a reflective film formed on at least one surface of said second base disk; and a transparent adhesive layer attaching said first and said second base disks together so that said first and said second information record layers are positioned on the beam input side and opposite side, and further so said first information record layer is on the beam input side to a greater extent than the second information record layer when a laser beam is irradiated onto the disk in order to reproduce said first and said second base disks, wherein, said first information record layer is recorded with information at a higher density compared to said second information record layer, information recorded on said first information record layer is reproduced by an optical pickup with optical parameters of a wavelength ($\lambda$) less than or equal to 460 nm and a numerical aperture (NA) greater than or equal to 0.6, information recorded on second information record layer is played back or reproduced with an optical pickup with optical parameters of a wavelength ($\lambda$) greater than or equal to 770 nm and less than or equal to 830 nm and further has a numerical aperture (NA) equal to 0.45 plus or minus 0.05, and said first information record layer has a semipermeable film with a reflectivity of 10 percent or more at a wavelength ($\lambda$) greater than or equal to 380 nm and less than or equal to 460 nm and with a transmittance of 40 percent or more at a wavelength ($\lambda$) greater than or equal to 770 nm and less than or equal to 830 nm.

3. An optical disk comprising:

first and second base disks made from transparent synthetic resin;

a first information record layer having a semipermeable reflective film formed on at least one surface of said first base disk;

a second information record layer having a reflective film formed on at least one surface of said second base disk; and a transparent adhesive layer attaching said first and said second base disks together so that said first and said second information record layers are positioned on the beam input side and opposite side, and further so said first information record layer is on the beam input side to a greater extent than the second information record layer when a laser beam is irradiated onto the disk in order to reproduce said first and said second base disks, wherein, said first information record layer is recorded with information at a higher density compared to said second information record layer, information recorded on said first information record layer is reproduced by an optical pickup with optical parameters of a wavelength ($\lambda$) less than or equal to 460 nm and a numerical aperture (NA) greater than or equal to 0.6, information recorded on second information record layer is played back or reproduced with an optical pickup with optical parameters of a wavelength ($\lambda$) greater than or equal to 770 nm and less than or equal to 830 nm and further has a numerical aperture (NA) equal to 0.45 plus or minus 0.05, and said semipermeable reflective film is comprised of silicon compounds.

4. An optical disk as claimed in claim 1, wherein said transparent adhesive layer has a thickness from 10 micrometers to 100 micrometers.

5. An optical disk comprising:

first and second base disks made from transparent synthetic resin;

a first information record layer having a semitransparent reflective film formed on at least one surface of said first base disk;

a second information record layer having a reflective film formed on at least one surface of said second base disk;

a third information record layer having a semitransparent reflective film formed on at least one surface of said second base disk; and a transparent adhesive layer for attaching said first and said second base disks together so that said first and said third information record layers are positioned on the beam input side and opposite side for playing back the respective information record layers on said first and said second base disks, and further so said first information record layer is on the beam input side to a greater extent than the third information record layer when a laser beam is irradiated onto the disk, wherein said first information record layer is recorded with information at high density information relative to information on said second information record layer, and said second information record layer is recorded with information at high density information relative to information on said third information record layer, and information recorded on said first information record layer is reproduced by an optical pickup at optical parameters of a wavelength ($\lambda$) less than or equal to 460 nm and a numerical aperture (NA) greater than or equal to 0.6, and information recorded on second information record layer is played back or reproduced with an optical pickup at optical parameters of a first laser beam having a wavelength ($\lambda$) greater than or equal to 615 nm and less than or equal to 655 nm and further has a numerical aperture (NA) equal to 0.6 plus or minus 0.05, and information recorded on third information record layer is played back or reproduced with an optical pickup at optical parameters of a third laser beam having a wavelength ($\lambda$) greater than or equal to 770 nm and less than or equal to 830 nm and further has a numerical aperture (NA) equal to 0.45 plus or minus 0.05.

6. An optical disk as claimed in claim 5, wherein information recorded on said second information record layer is reproduced by an optical pickup at optical parameters of a second laser beam having a wavelength ($\lambda$) less than or equal to 460 nm and a numerical aperture (NA) greater than or equal to 0.6.

7. An optical disk as claimed in claim 6, wherein information recorded on said second information record layer is reproduced by an optical pickup at optical parameters of a second laser beam having a wavelength ($\lambda$) less than or equal to 460 nm and a numerical aperture (NA) greater than or equal to 0.6 or by a wavelength ($\lambda$) greater than or equal to 615 nm and less than or equal to 655 nm and a numerical aperture (NA) equal to 0.6 plus or minus 0.05.

8. An optical disk as claimed in claim 5, wherein said first information record layer has optical parameters of a track pitch greater than or equal to 0.30 micrometers and less than or equal to 0.70 micrometers and a minimum track length greater than or equal to 0.15 micrometers and less than or equal to 0.40 micrometers, said second information record layer has optical parameters of a track pitch greater than or equal to 0.70 micrometers and less than or equal to 0.80 micrometers and a minimum track length greater than or equal to 0.40 micrometers and less than or equal to 0.45 micrometers, and said third information record layer has optical parameters of a track pitch greater than or equal to 1.40 micrometers and less than or equal to 1.70 micrometers and a minimum track length greater than or equal to 0.80 micrometers and less than or equal to 1.0 micrometers.

9. An optical disk as claimed in claim 5, wherein said first information record layer has a semitransparent reflective film a reflectivity of 40 percent at a wavelength ($\lambda$) less than or equal to 460 nm and greater than or equal to 360 nm, and further has a transmittance of 60 percent or more at a wavelength ($\lambda$) less than or equal to 830 nm and greater than or equal to 770 nm, said second information record layer has a semitransparent reflective film with a reflectivity of 20 percent at a wavelength ($\lambda$) less than or equal to 830 nm and greater than or equal to 615 nm, and further a transmittance of 60 percent or more at a wavelength ($\lambda$) less than or equal to 830 nm and greater than or equal to 770 nm, and said third information record layer has a reflectivity of 60 percent at a wavelength ($\lambda$) less than or equal to 830 nm and greater than or equal to 770 nm.

10. A optical disk as claimed in claim 9, wherein said semipermeable reflective layer is comprised of silicon compounds.

11. An optical disk as claimed in claim 2, wherein said transparent adhesive layer has a thickness from 10 micrometers to 100 micrometers.

12. An optical disk as claimed in claim 3, wherein said transparent adhesive layer has a thickness from 10 micrometers to 100 micrometers.

* * * * *